US011886970B2

(12) United States Patent
Hasegawa et al.

(10) Patent No.: US 11,886,970 B2
(45) Date of Patent: Jan. 30, 2024

(54) APPARATUS CONTROL DEVICE, APPARATUS, APPARATUS CONTROL METHOD, AND STORAGE MEDIUM

(71) Applicant: CASIO COMPUTER CO., LTD., Tokyo (JP)

(72) Inventors: Hirokazu Hasegawa, Koganei (JP); Yoshihiro Kawamura, Fussa (JP); Hiroki Atsumi, Tachikawa (JP); Miyuki Urano, Akiruno (JP); Toshiaki Kanamura, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 408 days.

(21) Appl. No.: 17/174,295

(22) Filed: Feb. 11, 2021

(65) Prior Publication Data
US 2021/0303964 A1 Sep. 30, 2021

(30) Foreign Application Priority Data

Mar. 25, 2020 (JP) ................................. 2020-054213

(51) Int. Cl.
*G05B 13/02* (2006.01)
*G06N 3/008* (2023.01)

(52) U.S. Cl.
CPC ......... *G06N 3/008* (2013.01); *G05B 13/0265* (2013.01)

(58) Field of Classification Search
CPC ..... G06N 3/008; G06N 20/00; G05B 13/0265
USPC ........................................................ 700/47
See application file for complete search history.

(56) References Cited

U.S. PATENT DOCUMENTS

| 6,754,560 | B2 | 6/2004 | Fujita et al. | |
|---|---|---|---|---|
| 2019/0143528 | A1 | 5/2019 | Hayashi | |
| 2019/0159719 | A1* | 5/2019 | Lo | A61B 5/0004 |
| 2019/0265901 | A1* | 8/2019 | Raboisson | G06F 8/65 |
| 2021/0389767 | A1* | 12/2021 | Watanabe | G01C 21/383 |

FOREIGN PATENT DOCUMENTS

| JP | 2009043699 A | 2/2009 | |
|---|---|---|---|
| JP | 4296736 B2 * | 7/2009 | ............ B25J 9/1602 |
| JP | 2011115944 A | 6/2011 | |
| JP | 2019072495 A | 5/2019 | |

OTHER PUBLICATIONS

Japanese Office Action (and English language translation thereof) dated Dec. 21, 2021, issued in Japanese Application No. JP 2020-054213.

* cited by examiner

*Primary Examiner* — Christopher E. Everett
(74) *Attorney, Agent, or Firm* — Holtz, Holtz & Volek PC

(57) ABSTRACT

An apparatus control device includes: at least one processor; and at least one first memory that stores a program executed by the processor, in which the processor acquires input data based on at least one of acceleration and angular velocity generated by application of an external force to an apparatus, classifies a plurality of the acquired input data into a plurality of clusters by an unsupervised clustering method, acquires relationship data representing relationship between the acquired input data and the plurality of classified clusters, and controls movement of the apparatus based on the acquired relationship data.

10 Claims, 9 Drawing Sheets

APPARATUS CONTROL DEVICE, APPARATUS, APPARATUS CONTROL METHOD, AND STORAGE MEDIUM

With regard to this application, priority shall be claimed based on Japanese Patent Application No. 2020-054213 filed on Mar. 25, 2020, and all the contents of the basic application shall be incorporated into this application.

BACKGROUND

1. Technical Field

The present invention relates to an apparatus control device, an apparatus, an apparatus control method, and a storage medium.

2. Related Art

There are known techniques for controlling movement of robots or various apparatuses so that they can be made similar to familiar beings such as friends and pets. For example, Japanese Patent Application Laid-Open No. 2009-43699 discloses a charger that imitates a small animal, and this charger includes an artificial eyeball for expressing a facial expression and an acceleration sensor. In this charger, when acceleration detected by the acceleration sensor is larger than a predetermined upper limit specified value, the artificial eyeball is controlled so that a surprised facial expression is generated.

SUMMARY

An aspect of an apparatus control device according to the present invention includes:
at least one processor; and
at least one first memory that stores a program executed by the processor, in which
the processor
acquires input data based on at least one of acceleration and angular velocity generated by application of an external force to an apparatus,
classifies a plurality of the acquired input data into a plurality of clusters by an unsupervised clustering method,
acquires relationship data representing relationship between the acquired input data and the plurality of classified clusters, and
controls movement of the apparatus based on the acquired relationship data.

DETAILED DESCRIPTION

Figure 1:
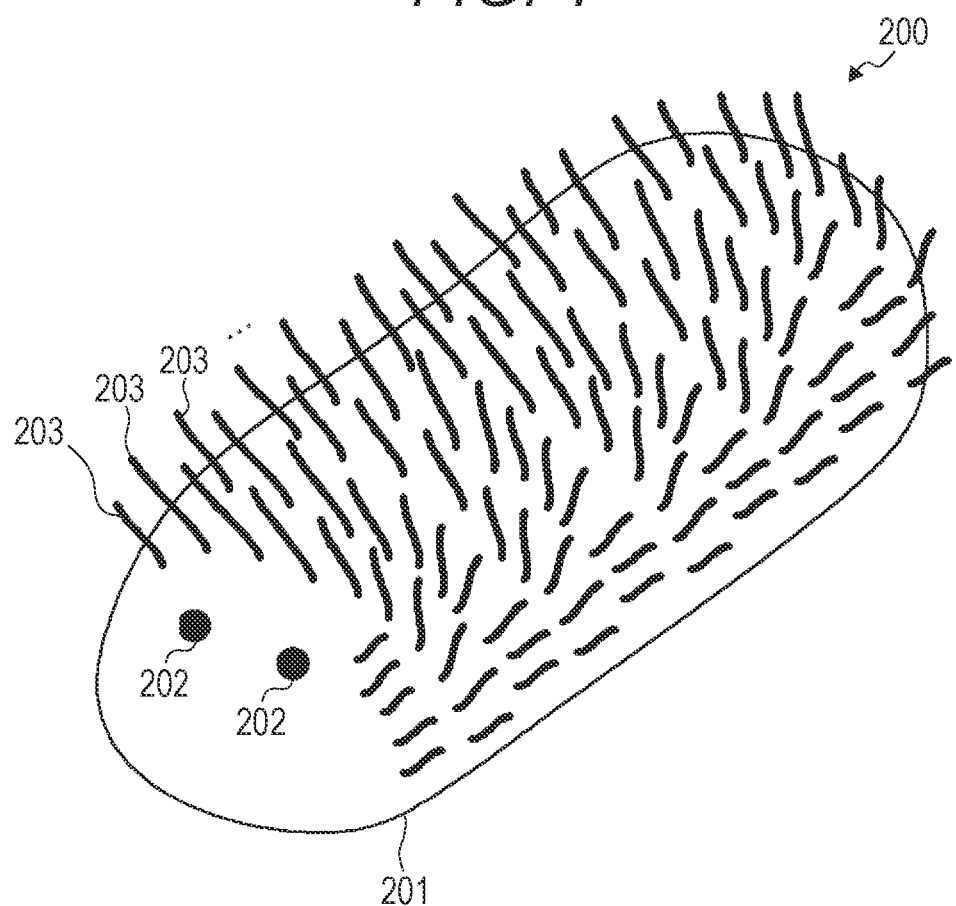
FIG. 1 is a diagram showing an appearance of a robot according to a first embodiment.

Hereinafter, embodiments of the present invention will be described with reference to the drawings. The same or corresponding parts in the drawings are designated by the same reference numerals.

First Embodiment

Figure 2:
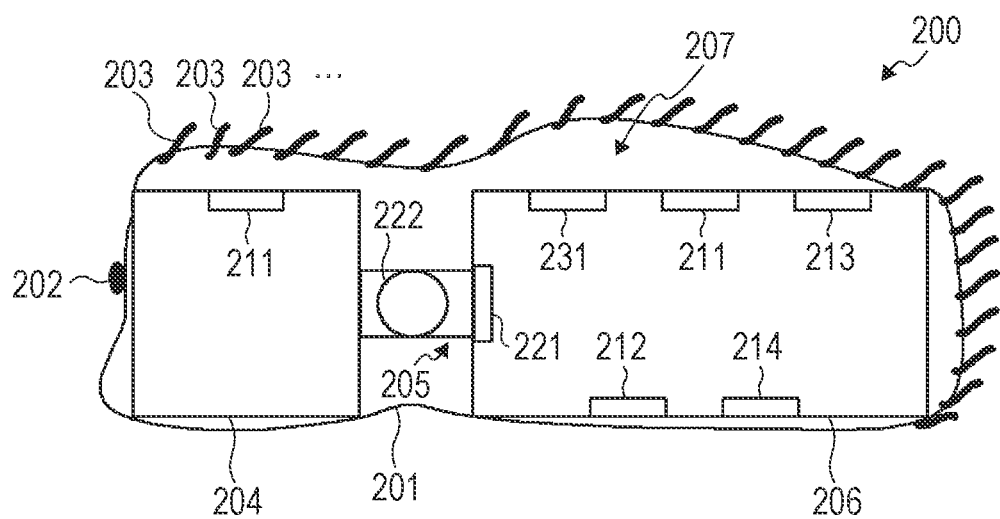
FIG. 2 is a cross-sectional view of the robot according to the first embodiment as viewed from a side.

An embodiment in which an apparatus control device according to a first embodiment of the present invention is applied to a robot 200 shown in FIG. 1 will be described with reference to the drawings. The robot 200 according to the embodiment is a pet robot that imitates a small animal. As shown in FIG. 1, the robot 200 is covered with an exterior 201 having eye-like decorative parts 202 and bushy hair 203. Further, a housing 207 of the robot 200 is housed in the exterior 201. As shown in FIG. 2, the housing 207 of the robot 200 includes a head portion 204, a connecting portion 205, and a body portion 206, and the head portion 204 and the body portion 206 are connected by the connecting portion 205.

Further, the exterior 201 is attached to the housing 207 with snap buttons so that movement of the housing 207 of the robot 200 is reflected in the exterior 201. Specifically, two snap buttons are provided in a front portion of the head portion 204, and two snap buttons are also provided in a back portion of the body portion 206. Corresponding positions of the exterior 201 are also provided with snap buttons that fit with the snap buttons provided on the head portion 204 and the body portion 206, and the exterior 201 is fastened and attached to the housing 207 by the snap buttons. The number and positions of the snap buttons shown here are examples and can be changed arbitrarily.

The body portion 206 extends in a front-rear direction, and comes into contact with a mounting surface such as a floor or a table on which the robot 200 is placed via the exterior 201. Then, as shown in FIG. 2, a twist motor 221 is provided at a front end portion of the body portion 206, and the head portion 204 is connected to the front end portion of the body portion 206 via the connecting portion 205. The connecting portion 205 is provided with a vertical motor 222. Although the twist motor 221 is provided in the body portion 206 in FIG. 2, the twist motor 221 may be provided in the connecting portion 205.

Figure 3:
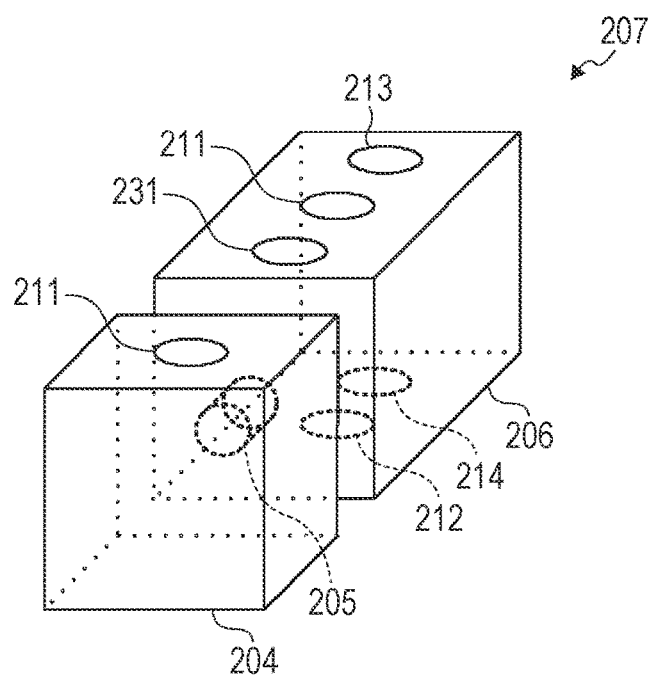
FIG. 3 is a diagram explaining a housing of the robot according to the first embodiment.
Figure 4:
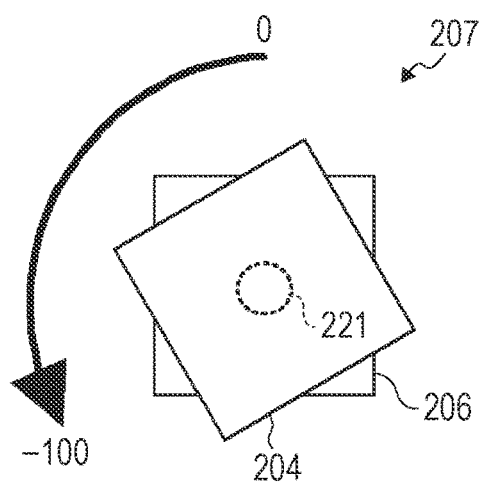
FIG. 4 is a diagram explaining an example of movement of a twist motor of the robot according to the first embodiment.
Figure 5:
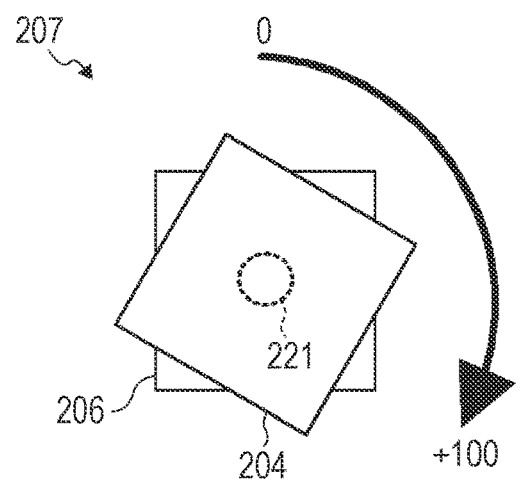
FIG. 5 is another diagram explaining an example of the movement of the twist motor of the robot according to the first embodiment.

The connecting portion 205 connects the body portion 206 to the head portion 204 rotatably around a first rotation axis extending in the front-rear direction of the body portion 206 through the connecting portion 205. As shown in FIGS. 4 and 5 as a front view of the housing 207, the twist motor 221 rotates the head portion 204 together with the vertical motor 222 clockwise (right-hand turn) with respect to the body portion 206 around the first rotation axis within a forward rotation angle range (forward rotation), or rotates the head portion 204 counterclockwise (left-hand turn) within a reverse rotation angle range (reverse rotation). A clockwise direction in this description is clockwise when a direction from the body portion 206 to the head portion 204 is viewed. In addition, clockwise rotation is also referred to as "twist rotation to the right", and counterclockwise rotation is also referred to as "twist rotation to the left". A maximum value of an angle to twist and rotate to the right or left is arbitrary. In FIGS. 4 and 5, the angle of the head portion 204 (hereinafter referred to as "twist reference angle") in a state where the head portion 204 is not twisted to the right or left as shown in FIG. 3 is represented by 0. Also, the angle when twisted and rotated to the leftmost (rotated counterclockwise) is represented by −100, and the angle when twisted and rotated to the rightmost (rotated clockwise) is represented by +100.

Figure 6:
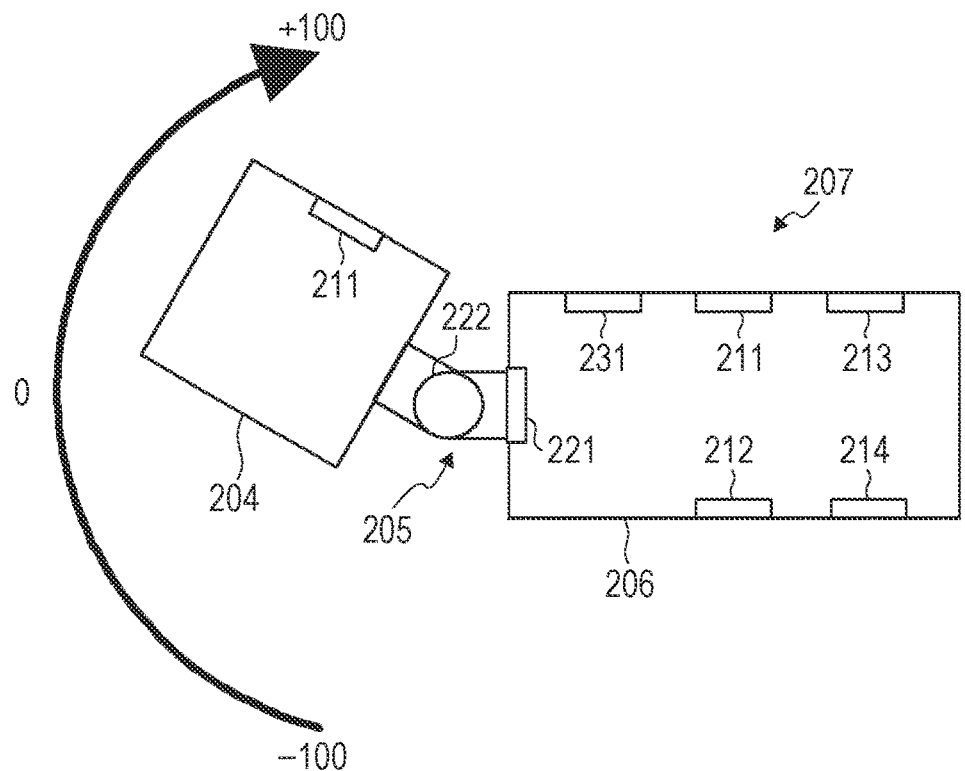
FIG. 6 is a diagram explaining an example of movement of a vertical motor of the robot according to the first embodiment.
Figure 7:
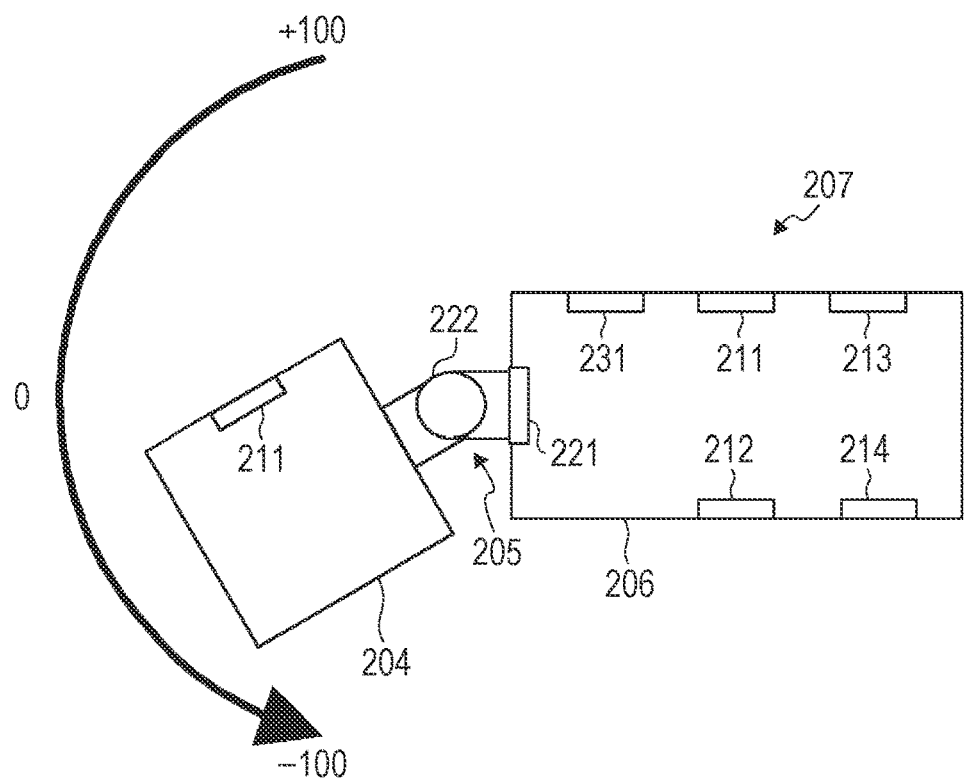
FIG. 7 is another diagram explaining an example of the movement of the vertical motor of the robot according to the first embodiment.

Further, the connecting portion 205 rotatably connects the body portion 206 to the head portion 204 around a second rotation axis extending in a width direction of the body portion 206 through the connecting portion 205. As shown in FIGS. 6 and 7 as side views of the housing 207, the vertical motor 222 rotates (forward rotation) the head portion 204 upward within a forward rotation angle range around the second rotation axis, and rotates (reverse rotation) downward within a reverse rotation angle range. The maximum value of the angle to rotate upward or downward is arbitrary, but in FIGS. 6 and 7, the angle of the head portion 204 when the head portion 204 is not rotated upward or downward (hereinafter "vertical reference angle") as shown in FIG. 2 is represented by 0, the angle when rotated most downward is represented by −100, and the angle when rotated most upward is represented by +100. When the head portion 204 is rotated at the vertical reference angle or below the vertical reference angle by vertical rotation around the second rotation axis, the head portion 204 can be brought into contact with a mounting surface such as a floor or a table, on which the robot 200 is placed, through the exterior 201. Note that FIG. 2 shows an example in which the first rotation axis and the second rotation axis are orthogonal to each other, but the first and second rotation axes do not have to be orthogonal to each other.

Further, as shown in FIG. 2, the robot 200 is provided with a touch sensor 211 on the head portion 204, and the touch sensor 211 can detect that a user has stroked or hit the head portion 204. Further, the body portion 206 is provided with the touch sensor 211 as well, and the touch sensor 211 can also detect that the user has stroked or hit the body portion 206.

In addition, the robot 200 is provided with an acceleration sensor 212 and a gyro sensor 214 on the body portion 206, and the acceleration sensor 212 and the gyro sensor 214 can detect a posture of the robot 200 itself, and that the robot 200 has been lifted, turned, or thrown by the user. Further, the robot 200 is provided with a microphone 213 on the body portion 206, and can detect an external sound. Further, the robot 200 is provided with a speaker 231 on the body portion 206, and can emit a cry of the robot 200 by using the speaker 231.

In the present embodiment, the acceleration sensor 212, the gyro sensor 214, the microphone 213, and the speaker 231 are provided on the body portion 206, but all or a part of these may be provided on the head portion 204. Further, in addition to the acceleration sensor 212, the gyro sensor 214, the microphone 213, and the speaker 231 provided on the body portion 206, all or a part of these may be provided on the head portion 204 as well.

Figure 8:
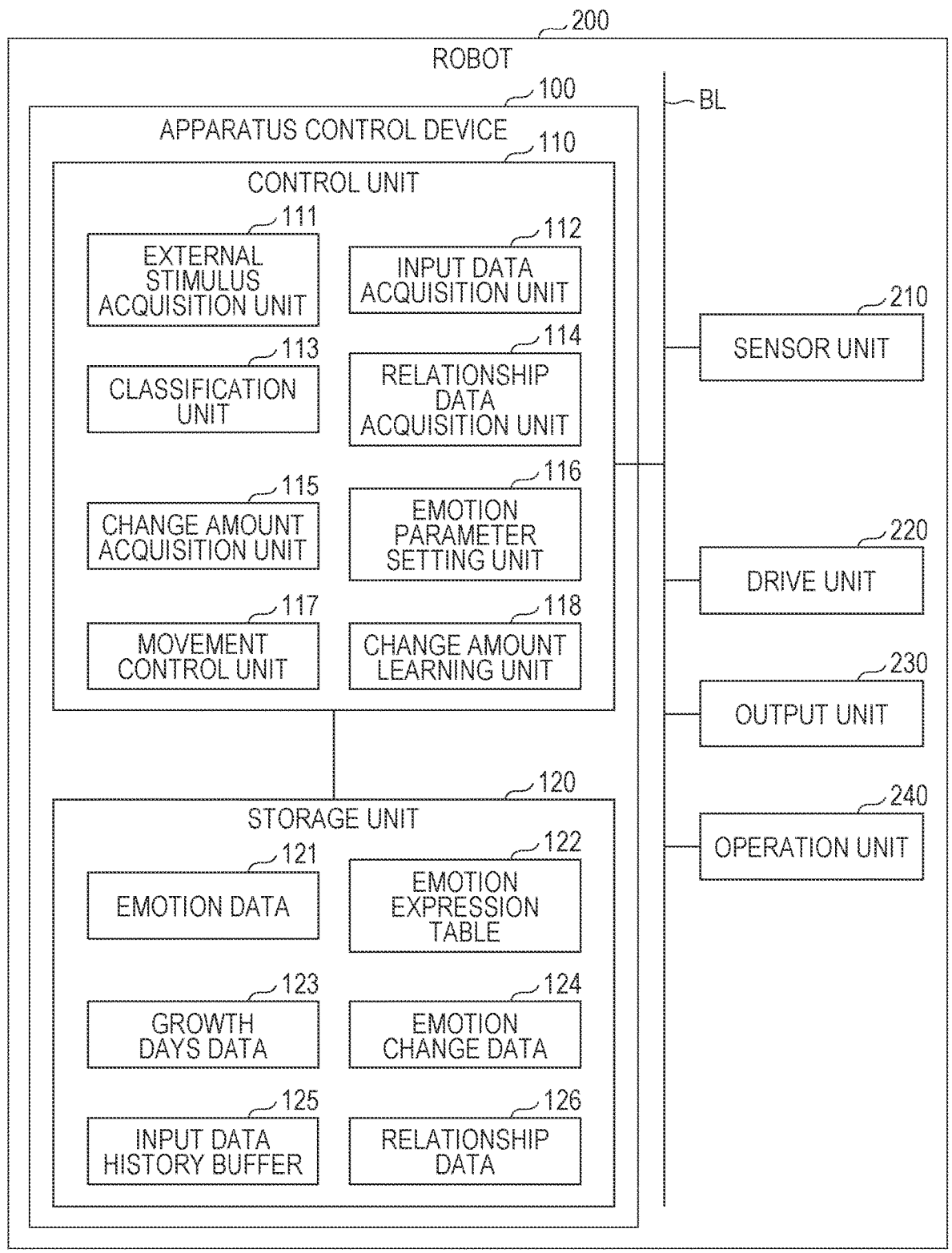
FIG. 8 is a block diagram showing a functional configuration of the robot according to the first embodiment.

Next, a functional configuration of the robot 200 will be described. As shown in FIG. 8, the robot 200 includes an apparatus control device 100, a sensor unit 210, a drive unit 220, an output unit 230, and an operation unit 240. The apparatus control device 100 includes a control unit 110 and a storage unit 120. In FIG. 8, the apparatus control device 100 and the sensor unit 210, the drive unit 220, the output unit 230, and the operation unit 240 are connected via a bus line BL, as an example. The apparatus control device 100 and the sensor unit 210, the drive unit 220, the output unit 230, and the operation unit 240 may be connected by a wired interface such as a universal serial bus (USB) cable or a wireless interface such as Bluetooth (registered trademark). Further, the control unit 110 and the storage unit 120 may be connected via the bus line BL.

The apparatus control device 100 controls movement of the robot 200 by the control unit 110 and the storage unit 120.

The control unit 110 is composed of, for example, a central processing unit (CPU) as at least one processor, and by executing a program stored in at least one storage unit 120, functions as each unit described later (an external stimulus acquisition unit 111, an input data acquisition unit 112, a classification unit 113, a relationship data acquisition unit 114, a change amount acquisition unit 115, an emotion parameter setting unit 116, and a movement control unit 117). Further, although not shown, the control unit 110 also has a clock function and a timer function, and can measure date and time and the like.

The storage unit 120 is composed of a read only memory (ROM), a flash memory, a random access memory (RAM), and the like. The ROM stores a program executed by the CPU of the control unit 110 and data necessary for executing the program in advance. The flash memory is a writable non-volatile memory that stores data to be kept even after the power is turned off. The RAM stores data created or modified during program execution.

The sensor unit 210 includes the touch sensor 211, the acceleration sensor 212, the gyro sensor 214, and the microphone 213 described earlier. The control unit 110 acquires detected values detected by various sensors included in the sensor unit 210 as external stimuli via the bus line BL. The sensor unit 210 may include a sensor other than the touch sensor 211, the acceleration sensor 212, the gyro sensor 214, and the microphone 213. By increasing types of sensors included in the sensor unit 210, types of external stimuli that can be acquired by the control unit 110 can be increased.

The touch sensor 211 detects that some object has come into contact. The touch sensor 211 is composed of, for example, a pressure sensor or a capacitance sensor. The detected value detected by the touch sensor 211 indicates contact strength. In addition, the touch sensor 211 is capable of directional contact detection, and detects the contact strength in a three-axial direction consisting of contact with the body portion 206 of the robot 200 from the front-rear direction (X-axis direction), from the width (left-right)

direction (Y-axis direction), and from the vertical direction (Z-axis direction). Therefore, the detected value of the touch sensor 211 is three-dimensional data including values of the contact strength from the X-axis direction, the contact strength from the Y-axis direction, and the contact strength from the Z-axis direction. The control unit 110 can detect that the robot 200 is being stroked or hit by the user based on the detected value from the touch sensor 211.

The acceleration sensor 212 detects the acceleration in the three-axial direction consisting of the front-rear direction (X-axis direction), the width (left-right) direction (Y-axis direction), and the vertical direction (Z-axis direction) of the body portion 206 of the robot 200. Therefore, the value of the acceleration detected by the acceleration sensor 212 is three-dimensional data including values of the acceleration in the X-axis direction, the acceleration in the Y-axis direction, and the acceleration in the Z-axis direction. Since the acceleration sensor 212 detects gravitational acceleration when the robot 200 is stationary, the control unit 110 can detect the current posture of the robot 200 based on the gravitational acceleration detected by the acceleration sensor 212. Further, for example, when the user lifts or throws the robot 200, the acceleration sensor 212 detects the acceleration accompanying the movement of the robot 200 in addition to the gravitational acceleration. Therefore, the control unit 110 can detect the movement of the robot 200 by removing a component of the gravitational acceleration from the detected value detected by the acceleration sensor 212.

The gyro sensor 214 detects the angular velocity when rotation is applied to the body portion 206 of the robot 200. Specifically, the gyro sensor 214 detects the angular velocity of the three-axial rotation consisting of rotation around the front-rear direction (X-axis direction) of the body portion 206, rotation around the width (left-right) direction (Y-axis direction), and rotation around the vertical direction (Z-axis direction). Therefore, the value of the angular velocity detected by the gyro sensor 214 is three-dimensional data including values of the angular velocity of the X-axis rotation, the angular velocity of the Y-axis rotation, and the angular velocity of the Z-axis rotation. By combining the detected value detected by the acceleration sensor 212 and the detected value detected by the gyro sensor 214, the movement of the robot 200 can be detected more accurately.

The touch sensor 211, the acceleration sensor 212, and the gyro sensor 214 are synchronized with each other, detect the contact strength, acceleration, and angular velocity at the same timing, respectively, and output the detected values to the control unit 110. Specifically, the touch sensor 211, the acceleration sensor 212, and the gyro sensor 214 detect the contact strength, acceleration, and angular velocity at the same timing, for example, every 0.25 seconds.

The microphone 213 detects sound around the robot 200. Based on sound components detected by the microphone 213, the control unit 110 can detect, for example, that the user is calling the robot 200, clapping his or her hands, or the like.

The drive unit 220 includes the twist motor 221 and the vertical motor 222. The drive unit 220 is driven by the control unit 110. As a result, the robot 200 can express movement such as lifting the head portion 204 (rotating upward around the second rotation axis), twisting the head portion 204 sideways (twisting and rotating to the right or left around the first rotation axis). Movement control data for performing such movement is recorded in an emotion expression table 122 described later, and the movement of the head portion 204 of the robot 200 is controlled based on pseudo emotions on an emotion map described later. Based on the movement control data recorded in the emotion expression table 122, the robot 200 performs, for example, movement that looks happy when one feels happy, and movement that looks sad when one feels sad.

The output unit 230 includes the speaker 231, and when the control unit 110 inputs sound data to the output unit 230, sound is output from the speaker 231. For example, when the control unit 110 inputs data of a cry of the robot 200 to the output unit 230, the robot 200 emits a pseudo cry of an animal. This data of the cry of the animal is also recorded in the emotion expression table 122, and a cry of the animal is selected based on pseudo emotions on the emotion map described later. Based on the animal cry data recorded in the emotion expression table 122, the robot 200 emits, for example, a cry that sounds happy when one feels happy, and a cry that sounds sad when one feels sad.

The output unit 230 is provided with a display such as a liquid crystal display and a light emitting unit such as a light emitting diode (LED) in place of the speaker 231 or in addition to the speaker 231 and may display emotions such as happiness and sadness on the display, or express emotions by colors and brightness of emitted light. In this case, based on the pseudo emotions on the emotion map, display contents on the display corresponding to each emotion, the colors and brightness of the light emitting unit, and the like need to be recorded in advance in the emotion expression table 122.

The operation unit 240 is composed of, for example, an operation button, a volume knob, and the like. The operation unit 240 is an interface for accepting user operations such as power on/off and volume adjustment of output sound.

Next, the functional configuration of the control unit 110 included in the apparatus control device 100 will be described. The control unit 110 functions as the external stimulus acquisition unit 111, the input data acquisition unit 112, the classification unit 113, the relationship data acquisition unit 114, the change amount acquisition unit 115, the emotion parameter setting unit 116, the movement control unit 117, and a change amount learning unit 118.

The external stimulus acquisition unit 111 acquires an external stimulus applied to the robot 200 from an outside based on the detected value from the sensor unit 210. Since the sensor unit 210 includes a plurality of sensors (the touch sensor 211, the acceleration sensor 212, the gyro sensor 214, and the microphone 213), the external stimulus acquisition unit 111 uses the plurality of sensors to acquire a plurality of external stimuli of different types.

The input data acquisition unit 112 acquires input data based on at least one of acceleration and the angular velocity generated by application of an external force to the robot 200, and stores the input data in an input data history buffer 125 described later.

Specifically, first, when an external force is applied to the robot 200 and the acceleration sensor 212 or the gyro sensor 214 detects acceleration equal to or higher than a threshold value or angular velocity equal to or higher than a threshold value, for example, in 0.75 seconds from the time the acceleration or the angular velocity is detected, the input data acquisition unit 112 detects values of the contact strength, the acceleration, and the angular velocity detected by the touch sensor 211, the acceleration sensor 212, and the gyro sensor 214. As described above, since the touch sensor 211, the acceleration sensor 212, and the gyro sensor 214 perform detection at intervals of 0.25 seconds, in the 0.75 seconds described above, three values are detected for each of the contact strength, acceleration, and angular velocity.

Subsequently, the input data acquisition unit 112 calculates a mean value and a standard deviation of the three values of each of the contact strength, acceleration, and angular velocity acquired as described above, and acquires the mean value and standard deviation as input data.

As described above, the contact strength, acceleration, and angular velocity are detected by three components of the X-axis direction, Y-axis direction, and Z-axis direction. Therefore, one input data item includes a mean value and a standard deviation of the component of the X-axis direction, a mean value and a standard deviation of the component of the Y-axis direction, and a mean value and a standard deviation of the component of the Z-axis direction of the contact strength, a mean value and a standard deviation of the component of the X-axis direction, a mean value and a standard deviation of the component of the Y-axis direction, and a mean value and a standard deviation of the component of the Z-axis direction of the acceleration, and a mean value and a standard deviation of the component of the X-axis direction, a mean value and a standard deviation of the component of the Y-axis direction, and a mean value and a standard deviation of the component of the Z-axis direction of the angular velocity. That is, the input data is 18-dimensional data composed of 18 values.

The input data acquired by the input data acquisition unit 112 is not limited to the above configuration, and may include any value as long as the value is based on at least one of the acceleration and the angular velocity generated by application of an external force to the robot 200. For example, the maximum value or the minimum value of the acceleration or angular velocity measured in 0.75 seconds may be included in the input data.

The classification unit 113 classifies a plurality of the input data stored in the input data history buffer 125 into a plurality of clusters by an unsupervised clustering method. A known method can be adopted as the clustering method used by the classification unit 113 as long as the method does not require teacher data for clustering the input data, and for example, K-means clustering is applicable. The number of clusters classified by the classification unit 113 may or may not be set in advance. When the number of clusters is not set, the classification unit 113 may automatically classify the plurality of input data into the optimum number of clusters based on distribution status of the plurality of input data.

The relationship data acquisition unit 114 acquires relationship data representing relationship between the input data acquired by the input data acquisition unit 112 and the plurality of clusters generated by the classification unit 113.

Specifically, first, the relationship data acquisition unit 114 specifies a cluster to which the input data acquired this time belongs among the plurality of classified clusters. Subsequently, the relationship data acquisition unit 114 obtains input data distance, which is distance of the input data from a center of the specified cluster in a feature space representing the relationship between the plurality of classified clusters and the input data acquired this time. The input data distance is normalized so that it ranges from 0 to 1. Subsequently, the relationship data acquisition unit 114 acquires relationship data 126 based on the input data distance. The relationship data 126 is data having a value in the range of 1 to 10, which becomes smaller as the input data distance increases. For example, if the input data distance is 0, which is the minimum, the value of relationship data 126 is 10, which is the maximum. If the input data distance is 1, which is the maximum, the value of the relationship data 126 is 1, which is the minimum.

The larger the value of the relationship data 126, that is, the smaller the input data distance, the higher the correlation between the input data acquired this time and the input data acquired so far. Therefore, the robot 200 is familiar with an external stimulus attributable to the input data this time. Therefore, the value of the relationship data 126 represents how familiar the robot 200 is to the external stimulus (hereinafter, referred to as degree of familiarity).

Figure 9A:
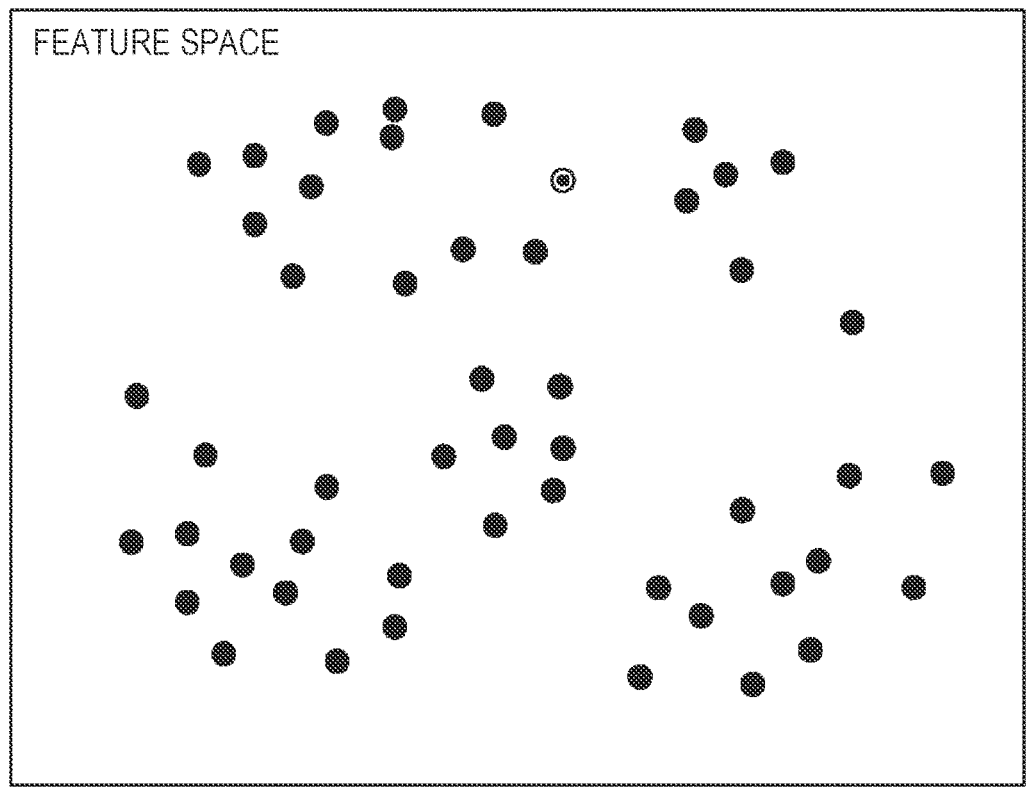
FIG. 9A is a diagram for explaining processing of a classification unit and relationship data acquisition unit according to the first embodiment.

Here, processing of the classification unit 113 and the relationship data acquisition unit 114 will be described with reference to FIGS. 9A and 9B. FIG. 9A is a diagram illustrating distribution of the plurality of input data stored in the input data history buffer 125 in the feature space. As described above, the input data is 18-dimensional data, but for ease of explanation, this figure illustrates the distribution in a two-dimensional feature space. In this figure, a black circle and a double circle represent the input data stored in the input data history buffer 125. The double circle is the input data acquired this time by the input data acquisition unit 112.

Figure 9B:
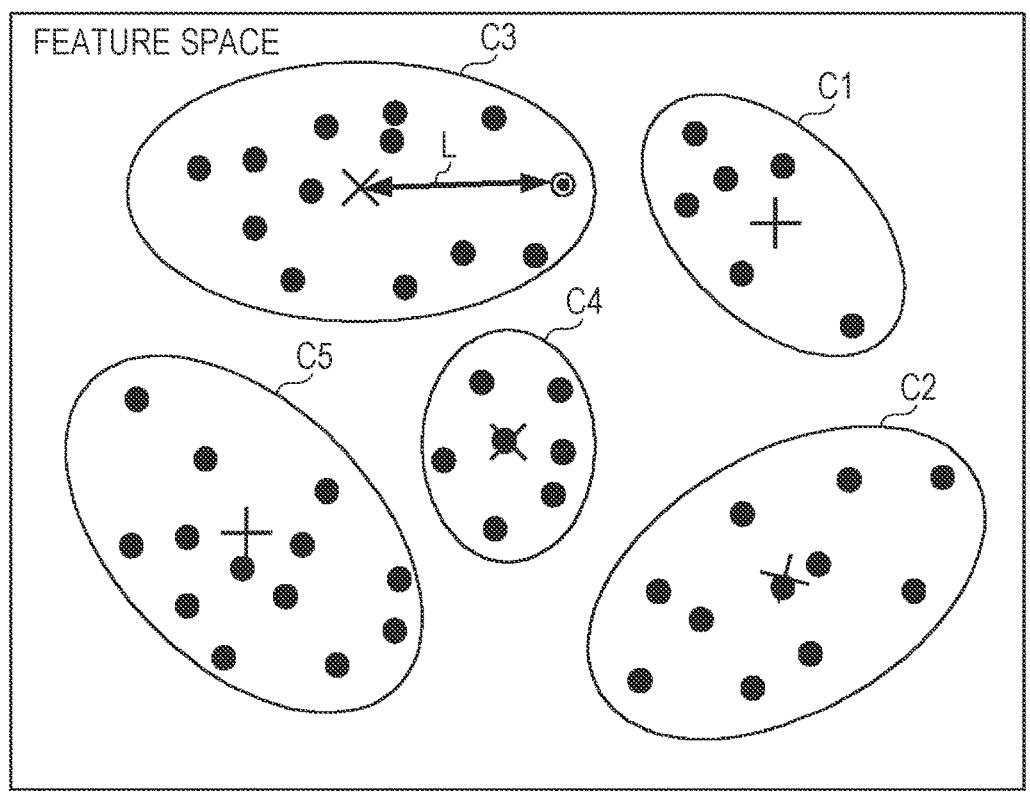
FIG. 9B is a diagram for explaining processing of the classification unit and the relationship data acquisition unit according to the first embodiment, which is different from FIG. 9A.

In this case, the classification unit 113 classifies the input data into five clusters C1 to C5, as shown in FIG. 9B. Also, from this figure, it can be seen that the cluster to which the input data acquired this time belongs is the cluster C3. Therefore, distance L from the center of the cluster C3 to the input data acquired this time is calculated as the input data distance, and the relationship data 126 is acquired based on the input data distance.

Returning to FIG. 8, the change amount acquisition unit 115 acquires an emotion change parameter (emotion change data 124 described later), which is a parameter that changes a pseudo emotion of the robot 200, according to an external stimulus acquired by the external stimulus acquisition unit 111. Then, the change amount acquisition unit 115 corrects the acquired emotion change parameter (emotion change data 124) according to the relationship data 126 acquired by the relationship data acquisition unit 114. The change amount acquisition unit 115 may acquire the emotion change parameter (emotion change data 124) according to the external stimulus after uniformly correcting all the emotion change parameters according to the relationship data 126. Further, the storage unit 120 stores a table that defines the emotion change parameter (emotion change data 124) corresponding to each set of the type of the external stimulus and the value of the relationship data 126, and a corrected value thereof. Then, the change amount acquisition unit 115 may acquire the emotion change parameter by referring to the table.

The emotion parameter setting unit 116 sets an emotion parameter (emotion data 121 described later) representing a pseudo emotion of the robot 200 according to the emotion change parameter (emotion change data 124) acquired by the change amount acquisition unit 115. As described above, since the emotion change parameter has been corrected according to the relationship data, the emotion parameter setting unit 116 sets the emotion parameter (the emotion data 121 described later) based on the relationship data.

The movement control unit 117 controls the movement of the robot 200 according to the emotion parameter (emotion data 121) set by the emotion parameter setting unit 116. Specifically, the movement control unit 117 drives the drive unit 220 based on the data (movement control data and animal cry data) of the emotion expression table 122 corresponding to the set emotion data 121, and outputs a cry of the animal from the output unit 230. As described above, the emotion change parameter is corrected according to the relationship data. Since the emotion parameter (emotion data 121) is set according to the emotion change parameter, the movement control unit 117 controls the movement of the robot 200 based on the relationship data.

The change amount learning unit 118 learns and stores the emotion change parameter (emotion change data 124 described later) according to the external stimulus acquired by the external stimulus acquisition unit 111. Specifically, the change amount learning unit 118 increases or decreases the emotion change data 124 according to the external stimulus by robot control processing described later.

Next, among the data stored in the storage unit 120, the emotion data 121, the emotion expression table 122, growth days data 123, the emotion change data 124, the input data history buffer 125, and the relationship data 126, which are characteristic data of the present embodiment, will be described in order.

Figure 10:
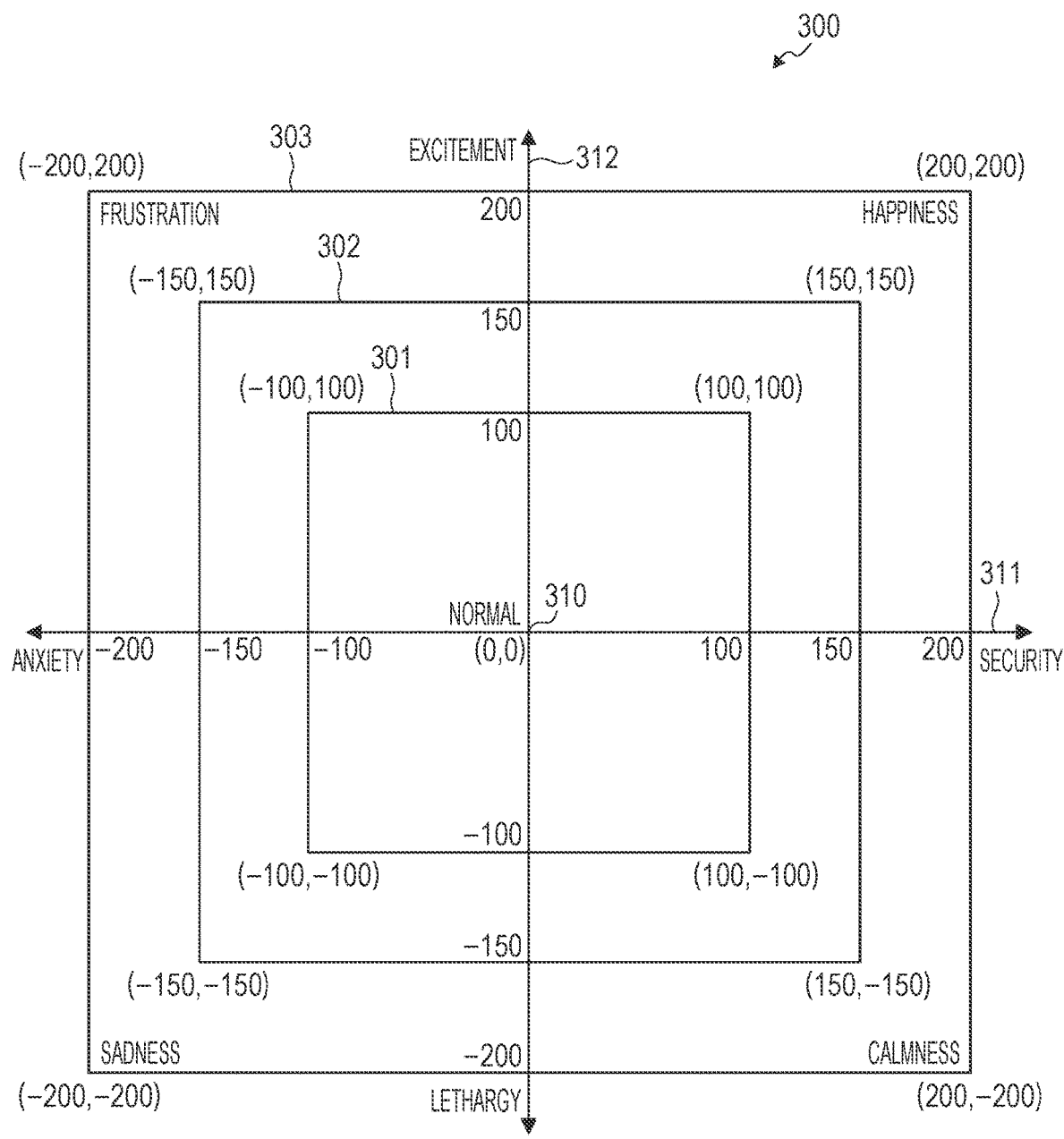
FIG. 10 is a diagram explaining an example of an emotion map according to the first embodiment.

The emotion data 121 is data for causing the robot 200 to have a pseudo emotion, and is data (X, Y) representing coordinates on an emotion map 300. As shown in FIG. 10, the emotion map 300 is represented by a two-dimensional coordinate system having an axis of security (anxiety) as an X-axis 311 and an axis of excitement (lethargy) as a Y-axis 312. An origin 310 (0, 0) on the emotion map 300 represents a normal emotion. When a value of an X-coordinate (X value) is positive and as an absolute value thereof increases, an emotion with a higher degree of security is expressed. When a value of a Y-coordinate (Y value) is positive and as an absolute value thereof increases, an emotion with a higher degree of excitement is expressed. Moreover, when the X value is negative and as the absolute value thereof increases, an emotion with a higher degree of anxiety is expressed. When the Y value is negative and as the absolute value thereof increases, an emotion with a higher degree of lethargy is expressed.

The emotion data 121 has two values, the X value (security and anxiety) and the Y value (excitement and lethargy), which represent a plurality of pseudo emotions (four in this embodiment) that are different from each other. Points on the emotion map 300 represented by the X value and the Y value represent pseudo emotions of the robot 200. An initial value of the emotion data 121 is (0, 0). Since the emotion data 121 is a parameter representing a pseudo emotion of the robot 200, the emotion data 121 is also called an emotion parameter. Although the emotion map 300 is represented by a two-dimensional coordinate system in FIG. 10, the number of dimensions of the emotion map 300 is arbitrary. The emotion map 300 may be defined in one dimension so that one value is set as the emotion data 121. Further, the emotion map 300 may be defined in a coordinate system having three or more dimensions by adding other axes so that values of the number of dimensions of the emotion map 300 are set as the emotion data 121.

In the present embodiment, the size of the emotion map 300 as an initial value is 100 as the maximum value and −100 as the minimum value for both the X value and the Y value, as shown in a frame 301 of FIG. 10. Then, during a first period, each time pseudo growth days of the robot 200 increase by one day, both the maximum value and the minimum value of the emotion map 300 are expanded by 2. Here, the first period is a period in which the robot 200 grows in a pseudo manner, and is, for example, a period of 50 days from a pseudo birth of the robot 200. The pseudo birth of the robot 200 is a first activation by a user after the robot 200 is shipped from a factory. When the number of growth days reaches 25 days, the maximum value of both the X value and the Y value becomes 150 and the minimum value becomes −150, as shown in a frame 302 of FIG. 10.

Then, after a lapse of the first period (50 days in this example), as shown in a frame 303 of FIG. 10, the maximum value of the X value and the Y value becomes 200 and the minimum value becomes −200, and the size of the emotion map 300 is fixed.

A settable range of the emotion data 121 is defined by the emotion map 300. Therefore, as the size of the emotion map 300 expands, the settable range of the emotion data 121 expands. Since the settable range of the emotion data 121 expands, a richer emotion can be expressed, so that the pseudo growth of the robot 200 is expressed through an expansion of the size of the emotion map 300. Then, the size of the emotion map 300 is fixed after the first period elapses, and the pseudo growth of the robot 200 ends.

The movement control data and the animal cry data are recorded in the emotion expression table 122. The movement control data and the animal cry data are data for setting the movement and a cry of the animal corresponding to each emotion represented by the coordinates on the emotion map 300. The emotion expression table 122 is represented by a two-dimensional array (movement control data [X'] [Y'] and animal cry data [X'] [Y']) for both the movement control data and the animal cry data. Values of X' and Y correspond to the coordinates (X, Y) on the emotion map 300 respectively, but in the present embodiment, values (rounded to the nearest whole numbers) each obtained by dividing the coordinates (X value and Y value) on the emotion map 300 by a reference magnification value (for example, 100) are used as indexes (X' value and Y' value) of the two-dimensional array of the emotion expression table 122. Here, assuming that the reference magnification value is 100, both the X' value and the Y' value can take five values of −2, −1, 0, 1, and 2. In this case, since there are five X' values and five Y' values, 5×5=25 types of movement control data and animal cry data are recorded in the emotion expression table 122. When the apparatus control device 100 expresses an emotion of the robot 200, the apparatus control device 100 uses a value of the emotion expression table 122 indicated by the indexes corresponding to the coordinates indicated by the current emotion data 121 of the robot 200. For example, if the emotion data 121 (X, Y) is (60, −30), the indexes (X', Y')=(1, 0) of the emotion expression table 122 is obtained (this is because X'=60÷100≈1, and Y'=−10÷100≈0), the emotion is expressed using the movement control data [1] [0] and the animal cry data [1] [0].

Correspondence between the coordinates of the emotion expression table 122 and the emotion map 300 is not limited to the above example. In the above example, a coordinate range is evenly divided into five stages for both the X-axis and the Y-axis. However, the coordinate range may be set freely, for example, as follow: dividing the part of the X-axis with 0 or more into ten stages, the part with less than 0 into two stages, the part of the Y-axis from −30 to 30 into three stages, the part less than −30 into five stages, the part over 30 into six stages, and so on. In addition, the movement and cry of the animal corresponding to each coordinate of the emotion map 300 (for example, 401×401=160801 types) may be set in the emotion expression table 122.

The growth days data 123 has an initial value of 1, and is increased by 1 each time one day elapses. The growth days data 123 represents pseudo growth days (the number of days since the pseudo birth) of the robot 200. Here, the period of the number of growth days represented by the growth days data 123 is referred to as a second period.

The emotion change data 124 is data for setting an amount of change that increases or decreases each of the X value and the Y value of the emotion data 121. In the present embodiment, the emotion change data 124 corresponding to the X value of the emotion data 121 includes DXP that increases the X value and DXM that decreases the X value, and the emotion change data 124 corresponding to the Y value of the emotion data 121 includes DYP that increases the Y value and DYM that decreases the Y value. That is, the emotion change data 124 consists of the following four variables. Since these variables are parameters that change pseudo emotions of the robot 200, they are also called emotion change parameters.

DXP: Easiness of feeling secured (easiness of changing the X value in a positive direction on the emotion map)

DXM: Easiness of feeling anxious (easiness of changing the X value in a negative direction on the emotion map)

DYP: Easiness of getting excited (easiness of changing the Y value in the positive direction on the emotion map)

DYM: Easiness of being lethargic (easiness of changing the Y value in the negative direction on the emotion map)

In the present embodiment, as an example, the initial values of all of these variables are set to 10, and the change amount learning unit 118 described above increases these variables up to 20. Since the emotion change data 124, that is, the degree of emotion change is changed by the change amount learning unit 118, the robot 200 has various personalities depending on how the user interacts with the robot 200. That is, each of the personalities of the robot 200 is formed differently depending on how the user interacts with the robot 200. In other words, the value of the emotion change parameter (emotion change data 124) represents a pseudo personality of the robot 200.

Further, in the present embodiment, the emotion change data 124, that is, the degree of emotion change is also changed by the relationship data 126 representing the degree of familiarity with an external stimulus. Therefore, the robot 200 can perform the movement taking into consideration how the user has interacted with the robot 200 in the past.

The input data history buffer 125 accumulates the input data acquired so far by the input data acquisition unit 112. There is a limit (for example, 200) on the number of input data that can be stored in the input data history buffer 125. When the input data exceeding the limit is newly stored in the input data history buffer 125, the input data having the earliest acquisition date and time among the stored input data is deleted.

The relationship data 126 is data indicating relationship between the input data acquired this time by the input data acquisition unit 112 and the plurality of clusters (clusters C1 to C5) into which the plurality of input data stored in the input data history buffer 125 are classified. Specifically, the relationship data 126 is acquired based on the distance of the input data (input data distance) from the center of the cluster to which the acquired input data belongs in the feature space representing the relationship between the plurality of clusters and the input data. The relationship data represents the degree of familiarity of the robot 200.

Next, the robot control processing executed by the control unit 110 of the apparatus control device 100 will be described with reference to the flowchart shown in FIG. 11. The robot control processing is processing in which the apparatus control device 100 controls the movement and cries of animals of the robot 200 based on a detected value from the sensor unit 210 and the like. When the user turns on the power of the robot 200, the robot control processing is started.

First, the control unit 110 sets various data such as the emotion data 121, the growth days data 123, and the emotion change data 124 (step S101). Initial values are set for values of these data when the robot 200 is first activated (when the robot is first activated by the user after shipment from the factory), but when the robot 200 is activated for the second time or later, values saved in step S113 of the previous robot control processing described later are set.

Next, the external stimulus acquisition unit 111 acquires an external stimulus from the sensor unit 210 (step S102).

Subsequently, the change amount acquisition unit 115 provisionally acquires the emotion change data 124 (emotion change parameter) to be added to or subtracted from the emotion data 121 (emotion parameter) in response to the external stimulus acquired in step S102 (step S103). For example, when it is detected by the touch sensor 211 on the head portion 204 that the head of the robot 200 is stroked as an external stimulus, the change amount acquisition unit 115 provisionally acquires DXP as the emotion change data 124 to be added to the X value of the emotion data 121.

Subsequently, the input data acquisition unit 112 determines whether or not the external stimulus acquired by the sensor unit 210 in step S102 is generated by application of an external force to the robot 200 (step S104). Specifically, the input data acquisition unit 112 may determine whether or not the external stimulus acquired by the sensor unit 210 includes acceleration equal to or higher than a threshold value or angular velocity equal to or higher than a threshold value.

For example, when the external stimulus is caused only by sound and is not generated by application of an external force to the robot 200 (No in step S104), the processing proceeds to step S110.

On the other hand, when the external stimulus is generated by application of the external force to the robot 200 (Yes in step S104), the input data acquisition unit 112 acquires the input data based on detected values of the touch sensor 211, the acceleration sensor 212, and the gyro sensor 214 (step S105). As described above, the input data is 18-dimensional data composed of the mean value and standard deviation of each component of the contact strength, acceleration, and angular velocity in the X-axis direction, the Y-axis direction, and the Z-axis direction measured by the touch sensor 211, the acceleration sensor 212, and the gyro sensor 214.

Subsequently, the control unit 110 newly stores the input data acquired in step S105 in the input data history buffer 125 (step S106). When the limit number of the input data history buffer 125 is exceeded, the control unit 110 deletes the oldest input data and then stores the acquired input data in the input data history buffer 125.

Subsequently, the classification unit 113 classifies the plurality of input data stored in the input data history buffer 125 into a plurality of clusters by using an unsupervised clustering method (step S107).

Subsequently, the relationship data acquisition unit 114 acquires the relationship data 126 representing the relationship between the input data acquired in step S105 and the plurality of clusters classified in step S107 (step S108).

Subsequently, the change amount acquisition unit 115 corrects the emotion change data 124 (emotion change parameter) provisionally acquired in step S103 based on the relationship data 126 acquired in step S108 (step S109). For example, when DXP is acquired as the emotion change data 124 in step S103, the change amount acquisition unit 115 divides the DXP value by a value of the relationship data as shown in the following equation.

$DXP=DXP/\text{Relationship data}$

As described above, the value of the relationship data is set in the range of 1 to 10. Therefore, in this example, the processing in step S109 reduces the DXP by up to 1/10 of the original value. Then, the processing proceeds to step S110.

In step S110, the emotion parameter setting unit 116 sets the emotion data 121 (emotion parameter) according to the emotion change data 124 (emotion change parameter) acquired in step S103 or the emotion change data 124 (emotion change parameter) corrected in step S109. Specifically, for example, if DXP has been acquired as the emotion change data 124 in step S103, the emotion parameter setting unit 116 adds the DXP of the emotion change data 124 to the X value (initial value at the first time) of the emotion data 121 obtained at that time. However, when the value (X value, Y value) of the emotion data 121 exceeds the maximum value of the emotion map 300 after the emotion change data 124 is added, the value of the emotion data 121 is set to the maximum value of the emotion map 300. Further, when the value of the emotion data 121 is less than the minimum value of the emotion map 300 after the emotion change data 124 is subtracted, the value of the emotion data 121 is set to the minimum value of the emotion map 300.

In steps S103 and S110, what kind of emotion change data 124 is acquired so as to set the emotion data 121 for each of the external stimuli can be arbitrarily set, but here, an example is shown below. The maximum and minimum values of the X and Y values of the emotion data 121 are defined by the size of the emotion map 300. Therefore, when the X and Y values exceed the maximum values of the emotion map 300, the maximum values are set, and when the X and Y values are below the minimum values of the emotion map 300, the minimum values are set, respectively, by the following calculations.

The head portion 204 being stroked (feeling secured): $X=X+DXP$

The head portion 204 being hit (feeling anxious): $X=X-DXM$ (These external stimuli can be detected by the touch sensor 211 on the head portion 204)

The body portion 206 being stroked (getting excited): $Y=Y+DYP$

The body portion 206 being hit (feeling lethargic): $Y=Y-DYM$ (These external stimuli can be detected by the touch sensor 211 on the body portion 206)

Embraced with the head up (feeling happy): $X=X+DXP$ and $Y=Y+DYP$

Suspended with the head down (feeling sad): $X=X-DXM$ and $Y=Y-DYM$ (These external stimuli can be detected by the touch sensor 211, the acceleration sensor 212, and the gyro sensor 214)

Called with a gentle voice (feeling calm): $X=X+DXP$ and $Y=Y-DYM$

Yelled loud (feeling frustrated): $X=X-DXM$ and $Y=Y+DYP$ (These external stimuli can be detected by the microphone 213)

For example, when the head portion 204 is stroked, the pseudo emotion of the robot 200 feels secured, and the DXP of the emotion change data 124 is added to the X value of the emotion data 121. On the contrary, when the head portion 204 is hit, the pseudo emotion of the robot 200 feels anxious, and the DXM of the emotion change data 124 is subtracted from the X value of the emotion data 121. In step S102, the external stimulus acquisition unit 111 acquires a plurality of external stimuli of different types by the plurality of sensors included in the sensor unit 210, so that the emotion change data 124 is acquired according to each of the plurality of external stimuli, and the acquired emotion data 121 is set according to the acquired emotion change data 124.

Then, the movement control unit 117 controls the movement of the robot 200 according to the emotion data 121 (emotion parameter) set in this way (step S111). Specifically, the drive unit 220 is driven to output cries of the animal from the output unit 230 based on the values (movement control data and animal cry data) of the emotion expression table 122 corresponding to the coordinates on the emotion map 300 indicated by the emotion data 121. When the emotion change data 124 is corrected in step S109, the movement control unit 117 returns the emotion change data 124 to a state before the correction, after the end of step S111.

Subsequently, the control unit 110 determines whether or not to end the processing (step S112). For example, when the operation unit 240 receives an instruction to turn off the power of the robot 200, the processing ends. If the processing ends (Yes in step S112), the control unit 110 saves various data such as the emotion data 121 and the emotion change data 124 in the non-volatile memory (for example, flash memory) of the storage unit 120 (step S113), and ends the robot control processing.

On the other hand, if the processing does not end (No in step S112), the control unit 110 determines whether or not the date has changed by the clock function (step S114). If the date has not changed (No in step S114), the processing returns to step S102. The processing of step S114 and the processing of steps S115 to S117 described later do not necessarily have to be performed, and if the processing does not end (No in step S112), the processing may immediately return to step S102.

On the other hand, if the date has changed (Yes in step S114), the control unit 110 determines whether or not the date is during the first period (step S115). Assuming that the first period is, for example, 50 days from the pseudo birth of the robot 200 (at the time of the first activation by the user after shipment from the factory), if the growth days data 123 is 50 or less, the control unit 110 determines that the date is during the first period. If not during the first period (No in step S115), the processing returns to step S102.

If the date is during the first period (Yes in step S115), the change amount learning unit 118 learns the emotion change data 124 (emotion change parameter) (step S116). Specifically, in step S110 of the day, if the X value of the emotion data 121 is set to the maximum value of the emotion map 300 even once, 1 is added to the DXP of the emotion change data 124, if the Y value of the emotion data 121 is set to the maximum value of the emotion map 300 even once, 1 is added to the DYP of the emotion change data 124, if the X value of the emotion data 121 is set to the minimum value of the emotion map 300 even once, 1 is added to the DXM of the emotion change data 124, and if the Y value of the emotion data 121 is set to the minimum value of the emotion map 300 even once, 1 is added to the DYM of the emotion change data 124. In this way, the emotion change data 124 is updated and learned. However, when each value of the emotion change data 124 becomes too large, the amount of one change of the emotion data 121 becomes too large. Therefore, the maximum value of each value of the emotion change data 124 is set to, for example, 20, and each value is limited to 20 or less. Further, here, 1 is added to any of the emotion change data 124, but for example, the number of times of setting each value to the maximum value or the minimum value is counted, and when the number of times is large, a numerical value to be added to the emotion change data 124 may be increased.

In the learning of the emotion change data 124 (emotion change parameter) in step S116, whether or not the emotion data 121 is set to the maximum value or the minimum value of the emotion map 300 in step S110 is determined based on the external stimulus acquired in step S102. Then, in step S102, since the plurality of external stimuli of different types is acquired by the plurality of sensors included in the sensor unit 210, each of the emotion change data 124 is learned according to each of the plurality of external stimuli. For example, if only the head portion 204 is stroked many times, only the DXP of the emotion change data 124 increases, and other elements of the emotion change data 124 do not change, so that the robot 200 has a personality that easily feels secured. Further, if only the head portion 204 is hit many times, only the DXM of the emotion change data 124 increases, and other elements of the emotion change data 124 do not change, so that the robot 200 has a personality that easily feel anxious. In this way, the change amount learning unit 118 learns the emotion change data 124 so as to make the emotion change data 124 be different from each other in response to each of the external stimuli.

Subsequently, the control unit 110 expands the emotion map 300 by only 2 for both the maximum value and the minimum value (step S117), adds 1 to the growth days data 123, and returns to step S102. Here, the emotion map 300 is expanded by only 2 for both the maximum value and the minimum value, but the numerical value to be expanded "2" is just an example, and may be expanded by 3 or more, or expanded by only 1. Further, the numerical value to be expanded does not have to be the same for each axis of the emotion map 300, and for the maximum value and the minimum value.

Figure 11:
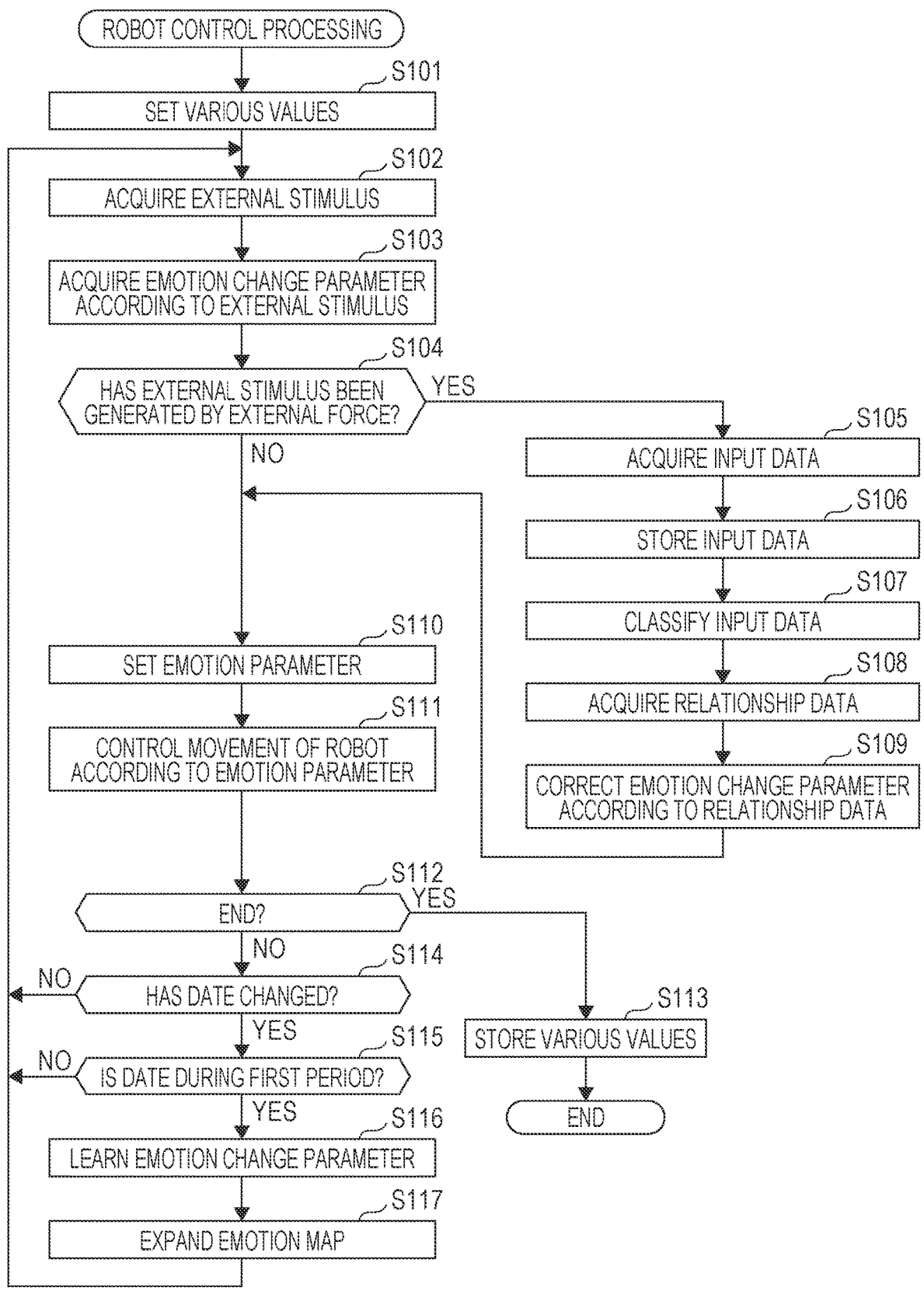
FIG. 11 is a flowchart showing a flow of robot control processing according to the first embodiment.

Further, in FIG. 11, it is assumed that the learning and the expansion of the emotion map are performed after it is determined that the date has changed in step S114, but the learning and the expansion of the emotion map may be performed after it is determined that reference time (for example, 9:00 pm) has been reached. Further, the determination in step S114 may not be performed based on an actual date, but may be performed based on a value accumulated by the timer function of the control unit 110 for the time when the robot 200 is turned on. For example, assuming that every time the accumulated power-on time becomes a multiple of 24, the robot 200 has grown for one day, and the learning and the expansion of the emotion map may be performed.

According to the robot control processing according to the first embodiment described above, the plurality of input data acquired based on at least one of the acceleration and the angular velocity generated by application of an external force is classified into a plurality of clusters, and the movement of the robot 200 is controlled based on the relationship data 126 representing the relationship between the input data acquired this time and the plurality of clusters. As a result, even with the same external stimulus, it is possible to control the robot 200 to perform different movements according to the external force applied so far so as to cause the robot 200 to move more expressively than before.

Further, according to the robot control processing according to the first embodiment, the emotion parameter (emotion data 121) representing the pseudo emotion of the robot 200 is set based on the relationship data 126, and the movement of the robot 200 is controlled based on the set emotion parameter (emotion data 121). As a result, complex emotions of the robot 200 can be easily expressed.

Further, according to the robot control processing according to the first embodiment, the relationship data is acquired based on the input data distance which is the distance of the input data from the center of the cluster to which the acquired input data belongs. Then, the emotion parameter (emotion data 121) is set so that the pseudo emotion of the robot 200 changes more greatly as the input data distance increases. As a result, for example, even if the same external stimulus is received, if many similar external stimuli have been received in the past, the input data distance becomes small, and the personality (emotion change data 124) can be controlled so as not to change much. Therefore, it is possible to cause the robot 200 to move more expressively like a real creature.

Further, according to the robot control processing according to the first embodiment, not only the acceleration and the angular velocity detected by the acceleration sensor 212 and the gyro sensor 214, but also a contact state (contact strength) generated, at the same timing as the acceleration and the angular velocity, is detected by the touch sensor 211, and the input data is acquired based on the acceleration, the angular velocity, and the contact state. As a result, information included in the input data becomes diverse, and it is possible to acquire the input data corresponding to various external stimuli. Therefore, it is possible to cause the robot 200 to move more expressively.

Second Embodiment

In the first embodiment described above, it is assumed that the owner (user) of the robot 200 is one user. Therefore, even if there is a plurality of users as the owners (users), and each of the plurality of users applies an external force to the robot 200 by hugging, stroking, or lifting the robot 200, the input data acquired according to the external force is stored in the same input data history buffer 125 without being distinguished, and the movement of the robot 200 is controlled based on the relationship data 126 acquired from the stored input data. That is, in the robot 200 of the first embodiment, the movement is controlled without distinguishing the user (owner) who has applied the external force, and when it is assumed that there is a plurality of users who is the owners (users), appropriate movement according to each of the owners (users) may not be realized.

Figure 12:
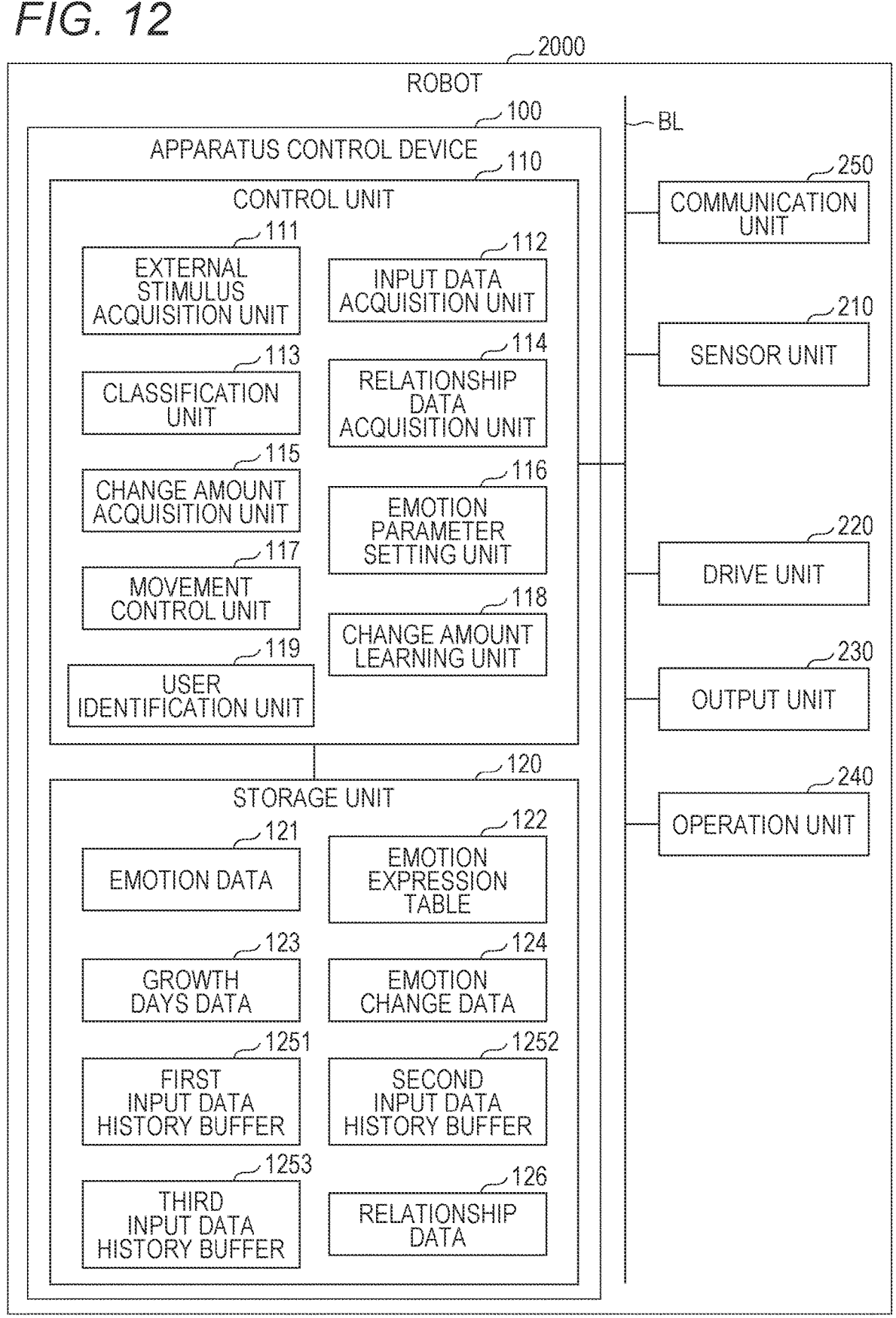
FIG. 12 is a block diagram showing a functional configuration of a robot according to a second embodiment.

On the other hand, a robot 2000 according to a second embodiment of the present invention shown in FIG. 12 can realize the movement according to each owner (user) even when it is assumed that there is a plurality of users who is the owners (users). It is assumed that the robot 2000 according to the second embodiment, for example, has three owners (users), and the users who are the three owners (users) are also referred to as users A to C below. As shown in FIG. 12, the robot 2000 according to the second embodiment is newly provided with a communication unit 250 as compared with the robot 200 according to the first embodiment. In addition, the robot 2000 is newly provided with a user identification unit 119 as a functional configuration of the control unit 110. Further, the robot 2000 stores three input data history buffers (a first input data history buffer 1251, a second input data history buffer 1252, and a third input data history buffer 1253) in the storage unit 120 as compared with the robot 200 according to the first embodiment.

The communication unit 250 is, for example, an interface for wirelessly connecting to the Internet. The robot 2000 receives a switching command for switching the owner (user) of the robot 2000 from a smartphone or the like (not shown) via the communication unit 250.

The user identification unit 119 identifies each of a plurality of the users A to C set as the owners (users). Specifically, the user identification unit 119 identifies (switches the user to) the current owner (user) of the robot 2000, among the users A to C, based on the switching command received by the communication unit 250. The user identification unit 119 may switch the users A to C, who are the owners (users), based on instructions received via the operation unit 240 and the microphone 213.

The first input data history buffer 1251, the second input data history buffer 1252, and the third input data history buffer 1253 are provided corresponding to the users A to C, who are the owners (users) of the robot 2000, respectively, and the input data caused by actions of the corresponding users A to C is stored. Specifically, the input data acquired by the user A applying an external force to the robot 2000 is stored in the first input data history buffer 1251. Further, the input data acquired by the user B applying an external force to the robot 2000 is stored in the second input data history buffer 1252. Further, the input data acquired by the user C applying an external force to the robot 2000 is stored in the third input data history buffer 1253. When there are four or more owners of the robot 2000, new input data history buffers corresponding to the number of the owners may be provided.

Subsequently, the robot control processing in the second embodiment will be described. The robot control processing in the second embodiment is substantially the same processing as the robot control processing (FIG. 11) in the first embodiment. However, in steps S106 to S108, processing corresponding to the user, among the users A to C, who is identified as the current owner (user) of the robot 2000 by the user identification unit 119, is executed.

Specifically, in step S106, the control unit 110 stores the data acquired in step S105 in the first to third input data history buffers 1251 to 1253 corresponding to the user, among the users A to C, who is identified as the current owner (user) (hereinafter referred to as identified user) by the user identification unit 119. Then, in step S107, the classification unit 113 classifies the input data stored in the input data history buffers 1251 to 1253 corresponding to the identified user by an unsupervised clustering method. Then, in step S108, the relationship data acquisition unit 114 acquires the relationship data 126 representing the relationship between the input data acquired in step S105 and a cluster classified according to the identified user. After that, the same processing as the robot control processing in the first embodiment is executed.

As described above, in the present embodiment, the input data is separately stored for each user who is the owner (user) of the robot 2000, and the input data corresponding to the user who is the current owner (user) is classified into clusters so that the relationship data 126 is acquired. Therefore, even if the same external stimulus is applied to the robot, the relationship data 126 that is different depending on the user will be acquired. As a result, even when there is a plurality of owners (users), it is possible to cause the robot to perform the movement according to the owner (user).

Modifications

The present invention is not limited to the above-described embodiments, and various modifications and applications are possible. For example, in the above-mentioned emotion expression table 122, the movement of the head portion 204 of the robot 200 and the cry of the animal corresponding to each emotion represented by the coordinates on the emotion map are set, but only the movement of the head portion 204 or only the cry of the animal may be set. Further, control other than the movement of the head portion 204 or the cry of the animal may be set. As control other than the movement of the head portion 204 and the cry of the animal, for example, when the output unit 230 of the robot 200 is provided with a light emitting diode (LED), it is conceivable to control colors and brightness of the LED to be turned on.

Further, in the above-described embodiments, the relationship data acquisition unit 114 specifies a cluster to which the input data acquired this time belongs from among the plurality of classified clusters, and based on the input data distance, which is the distance from the center of the specified cluster to the input data, acquires the relationship data 126. However, a method by which the relationship data acquisition unit 114 acquires the relationship data 126 from the classified cluster is not limited to this. For example, the relationship data acquisition unit 114 may acquire a value (degree of familiarity) of the relationship data 126 based on acquisition timing of the input data included in the specified cluster.

Specifically, the relationship data acquisition unit 114 obtains a mean value of acquisition dates and times of the plurality of input data (average input data acquisition date and time) included in the specified cluster. Then, the relationship data acquisition unit 114 may correct the value (degree of familiarity) of the relationship data 126 acquired based on the input data distance so that the earlier the average input data acquisition date and time, the smaller the value (degree of familiarity). Alternatively, without using the input data distance, the relationship data acquisition unit 114 may acquire the relationship data 126 by calculating a value in the range of 1 to 10 which becomes smaller as the average input data acquisition date and time becomes earlier based on a predetermined standard.

By so doing, when an external stimulus similar to the external stimulus applied in an earlier period is applied to the robots 200 and 2000, the robots 200 and 2000 can be caused to move as though they have forgotten the external stimulus applied in the earlier period and are not used to the stimulus this time. As a result, it is possible to cause the robots 200 and 2000 behave more like creatures. When the relationship data 126 is acquired based on the acquisition time of the input data in this way, the input data to be clustered may be acquired not only from the external stimulus by the external force but also from any external stimulus including sound and the like.

Further, in the above embodiments, the value (emotion) of the emotion data 121 is changed based on the value (personality) of the emotion change data 124, and the movement of the robot is controlled based on the value of the emotion data 121. However, if a predetermined condition such as an extreme personality is satisfied, the movement of the robot may be directly controlled based on the value (personality) of the emotion change data 124. Specifically, each of the plurality of personality movements (movement control data and animal cry data) of the robots 200 and 2000 is set in advance corresponding to each of the DXP, the DYP, the DXM, and the DYM of the emotion change data 124. For example, the personality movements are set in advance so that the DXP corresponds to a personality movement in which the robots 200 and 2000 behave cheerfully, the DYP corresponds to a personality movement in which the robots 200 and 2000 behave actively, the DXM corresponds to a personality movement in which the robots 200 and 2000 behave shyly, and the DYM corresponds to a personality movement in which the robots 200 and 2000 behave in a spoiled manner. Then, when an external stimulus is acquired, the control unit 110 uniformly corrects the DXP, the DYP, the DXM, and the DYM of the emotion change data 124 according to the relationship data 126, and then when the maximum value among these elements is equal to or higher than a threshold value (for example, 18 or more), the robots 200 and 2000 may be controlled so as to perform the personality movements corresponding to the emotion change data 124 having the maximum value. By so doing, it is possible to realize movements from which one can feel more of the personalities of the robots 200 and 2000.

Further, in the above-described embodiments, the size of the emotion map is expanded by 2 for both the maximum value and the minimum value of the emotion map each time the pseudo growth days of the robots 200 and 2000 increase by one day during the first period. However, the size of the emotion map does not have to be expanded evenly in this way. For example, how to expand the emotion map may be changed according to how the emotion data 121 changes.

In order to change how to expand the emotion map according to how the emotion data 121 changes, for example, in step S117 of the robot control processing (FIG. 11), the following processing may be performed. If the value of the emotion data 121 is set to the maximum value of the emotion map even once in step S110 in a certain day, the maximum value of the emotion map is increased by 3 in the subsequent step S117. If the value of the emotion data 121 never reaches the maximum value of the emotion map in step S110, the maximum value of the emotion map is increased by 1 in the subsequent step S117.

Similarly for the minimum value of the emotion map, if the value of the emotion data 121 is set to the minimum value of the emotion map even once in the day, the minimum value of the emotion map is reduced by 3. If the value of the emotion data 121 never reaches the minimum value of the emotion map, the minimum value of the emotion map is reduced by 1. By changing how to expand the emotion map in this way, the settable range of the emotion data 121 is learned in response to the external stimulus.

However, when a length of the first period is, for example, 50 days, if the emotion map is expanded in this way, the maximum value of the emotion map can be 250 and the minimum value can be −250. Therefore, the movement control data and the animal cry data need to be registered so that the emotion expression table 122 can respond to the maximum value 250 and the minimum value −250. In the above-described embodiments and modifications, the emotion map is always expanded during the first period, but the change in the range of the emotion map is not limited to expansion. For example, the range of the emotion map may be reduced for a direction of emotions that rarely occur in response to external stimuli.

In this way, by changing how to expand the emotion map in response to external stimuli, not only the emotion change parameter (emotion change data 124) but also the emotion map can be used to represent the pseudo personalities of the robots 200 and 2000. Therefore, the robots 200 and 2000 can express more diverse personalities depending on how the user interacts with the robots 200 and 2000.

Figure 13:
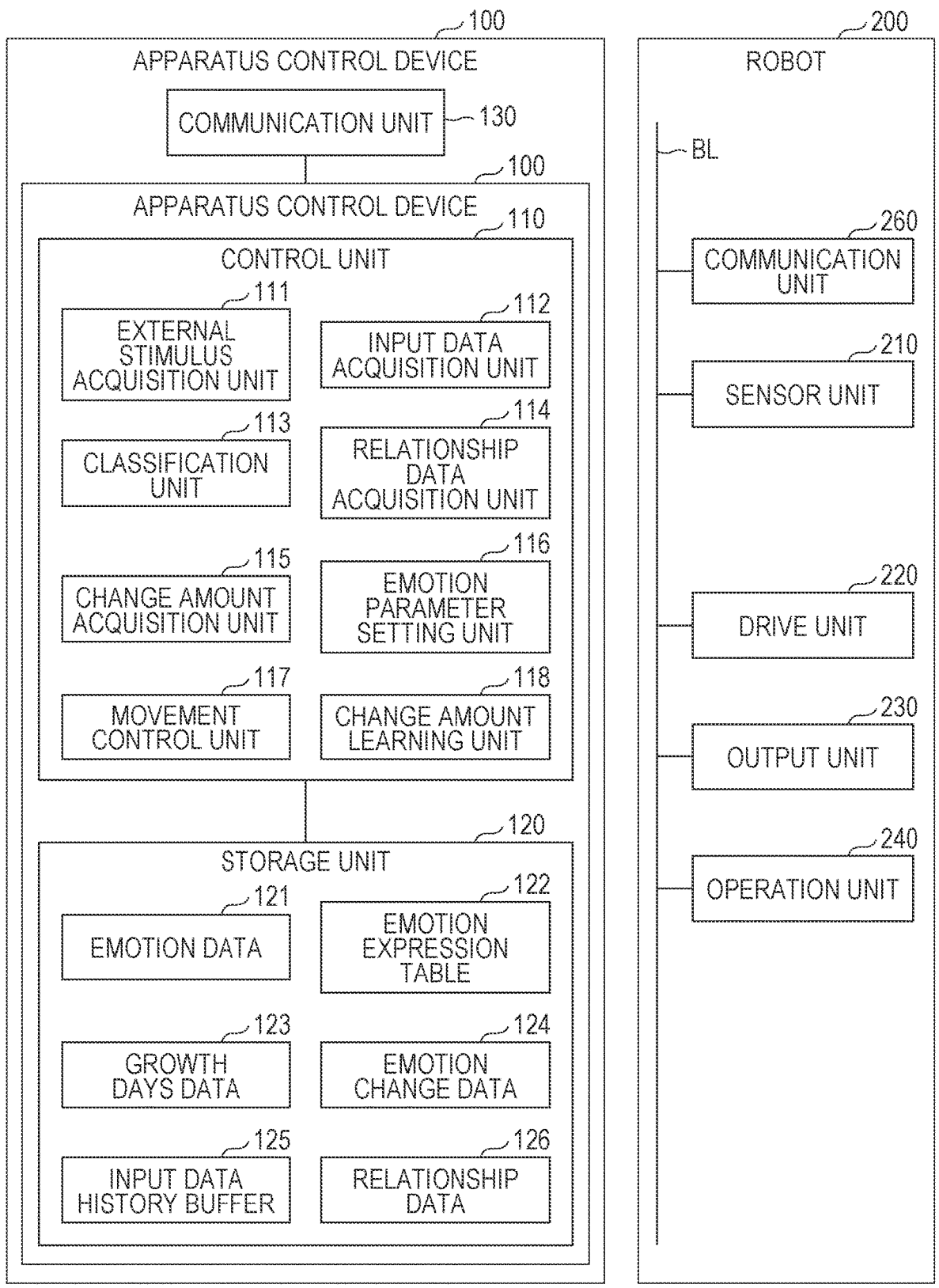
FIG. 13 is a block diagram showing a functional configuration of an apparatus control device and a robot according to a modification.

Further, in the above-described embodiments, the robot 200 has a configuration in which the apparatus control device 100 is built inside. However, as shown in FIG. 13, the apparatus control device 100 may be configured as a separate device (for example, a server) instead of being built inside the robot 200. In this modification, the apparatus control device 100 includes a communication unit 130, the robot 200 also includes a communication unit 260, and the communication unit 130 and the communication unit 260 are configured to transmit and receive data to and from each other. Then, the external stimulus acquisition unit 111 acquires an external stimulus detected by the sensor unit 210 via the communication unit 130 and the communication unit 260, and the movement control unit 117 controls the drive unit 220 and the output unit 230 via the communication unit 130 and the communication unit 260. Although not shown, similarly, the robot 2000 according to the second embodiment may have the apparatus control device 100 configured as a separate device.

Further, in the above-described embodiment, the apparatus control device 100 is a control device that controls the robots 200 and 2000, but an apparatus to be controlled is not limited to the robots 200 and 2000. As an apparatus to be controlled, for example, a wristwatch or the like can be considered. For example, when a wristwatch capable of outputting sound and equipped with an acceleration sensor or a gyro sensor is used as an apparatus to be controlled, an external stimulus can be assumed to be an impact applied to the wristwatch detected by the acceleration sensor or the gyro sensor. Then, the emotion change data 124 and the emotion data 121 are updated in response to this external stimulus. It can be considered that based on the emotion data 121 at the time when the user wears the wristwatch, sound data set in the emotion expression table 122 is output.

As a result, if the wristwatch is handled roughly, the wristwatch emits a sad sound when the user wears it, and if the wristwatch is handled carefully, the wristwatch emits a happy sound when the user wears it. Furthermore, if the emotion change data 124 is set during the first period (for example, 50 days), the wristwatch will have individuality (pseudo personality) depending on how the user handles the wristwatch during the first period. This means that, even if the wristwatch has the same model number, if the user handles it carefully, it becomes a wristwatch that easily feels happy, and if it is handled roughly, it becomes a wristwatch that easily feel sad.

In this way, the apparatus control device 100 can be applied not only to robots but also to various apparatuses. When the apparatus control device 100 is applied to an apparatus, the apparatus can be provided with pseudo emotions and personality, and the user can be made to feel as though he or she is raising the apparatus in a pseudo manner.

In the above-described embodiment, the operation program executed by the CPU of the control unit 110 is stored in advance in the ROM or the like of the storage unit 120. However, the present invention is not limited to this, and the operation program for executing the above-mentioned various types of processing may be mounted on an existing general-purpose computer or the like so that the operation program can function as a device corresponding to the apparatus control device 100 according to the above-described embodiments.

The method of providing such a program is arbitrary. For example, the program may be stored in a computer-readable recording medium (flexible disk, compact disc (CD)-ROM, digital versatile disc (DVD)-ROM, magneto-optical disc (MO), a memory card, USB memory, etc.) and distributed, or the program may be stored in a storage on a network such as the Internet and provided through download of the program.

Further, when the above-mentioned processing is executed by a division of an operating system (OS) and an application program or cooperation between the OS and the application program, only the application program may be stored in the recording medium or the storage. Further, it is also possible to superimpose the program on a carrier wave and distribute it via a network. For example, the above program may be posted on a bulletin board system (BBS) on the network and distributed via the network. Then, by starting this program and executing it in the same manner as other application programs under the control of the OS, the above processing may be executed.

The present invention allows for various embodiments and modifications without departing from the broad spirit and scope of the present invention. Moreover, the above-described embodiment is for explaining the present invention, and does not limit the scope of the present invention. That is, the scope of the present invention is indicated not by the embodiments but by the claims. Then, various modifications made within the scope of the claims and the equivalent meaning of the invention are considered to be within the scope of the present invention.

What is claimed is:

1. An apparatus control device comprising:
at least one processor; and
at least one first memory that stores a program executed by the processor,
wherein, under control of the program, the processor:
repeatedly acquires input data based on sensor data indicating at least one of acceleration and angular velocity generated by application of an external force to an apparatus and detected by at least one sensor provided to the apparatus, to thereby acquire a plurality of pieces of input data, wherein each piece of input data comprises a predetermined number of feature components having values calculated from the sensor data;
maps the plurality of pieces of input data in n-dimensional feature space according to the values of the feature components of each of the plurality of pieces of input data, where n is the predetermined number of feature components constituting each of the plurality of pieces of input data, and classifies the acquired plurality of pieces of input data into a plurality of clusters in the n-dimensional feature space by an unsupervised clustering method based on a distribution status of the plurality of pieces of input data in the n-dimensional feature space,
newly acquires a piece of input data based on newly detected sensor data detected by said at least one sensor provided to the apparatus;
maps the newly acquired piece of input data to the n-dimensional feature space according to values of the feature components of the newly acquired piece of input data and determines, as a cluster to which the newly acquired input data belongs, a cluster which is closest to the newly acquired piece of input data in the n-dimensional feature space from among the plurality of clusters;
calculates a distance in the n-dimensional feature space between the newly acquired piece of input data and a center of the cluster to which the newly acquired piece of input data belongs, and acquires relationship data representing a relationship between the newly acquired piece of input data and the cluster to which the newly acquired piece of input data belongs, based on the calculated distance, and
controls movement of the apparatus based on the acquired relationship data.

2. The apparatus control device according to claim 1, wherein the processor:
sets an emotion parameter representing a pseudo emotion of the apparatus based on the relationship data, and
controls movement of the apparatus based on the set emotion parameter.

3. The apparatus control device according to claim 2, wherein the processor sets the emotion parameter so that a pseudo emotion of the apparatus represented by the emotion parameter changes more greatly as the calculated distance increases.

4. The apparatus control device according to claim 1, wherein the processor acquires the relationship data based further on an acquisition timing of pieces of input data among the plurality of pieces of input data which are included in the cluster to which the newly acquired piece of input data belongs.

5. The apparatus control device according to claim 1, wherein the processor:
receives a user input identifying a user from among a plurality of users of the apparatus,
acquires the input data in correspondence with each of the plurality of users based on an identification result of each of the plurality of users,
stores a plurality of pieces of the input data in a second memory in correspondence with each of the plurality of users based on the identification result,
classifies the plurality of pieces of input data into a plurality of clusters in correspondence with each of the plurality of users based on the identification result of each of the plurality of users, and
acquires the relationship data in correspondence with each of the plurality of users based on the identification result of each of the plurality of users.

6. The apparatus control device according to claim 1, wherein the processor acquires the input data based on the acceleration and the angular velocity generated at a same timing by application of an external force to the apparatus and a state of contact with the apparatus at a timing when the acceleration and the angular velocity are generated.

7. The apparatus control device according to claim 1, wherein the processor:
sets each of a plurality of personality movements of the apparatus in correspondence with each of a plurality of emotion change parameters which are different from each other, and
when an external force is applied to the apparatus, controls the apparatus so as to execute one of the personality movements corresponding to one of the emotion change parameters having a maximum value among the plurality of personality movements.

8. An apparatus comprising the apparatus control device according to claim 1.

9. An apparatus control method executed by at least one hardware processor, the method comprising:
repeatedly acquiring input data based on sensor data indicating at least one of acceleration and angular velocity generated by application of an external force to an apparatus and detected by at least one sensor provided to the apparatus, to thereby acquire a plurality of pieces of input data, wherein each piece of input data comprises a predetermined number of feature components having values calculated from the sensor data;

mapping the plurality of pieces of input data in n-dimensional feature space according to the values of the feature components of each of the plurality of pieces of input data, where n is the predetermined number of feature components constituting each of the plurality of pieces of input data, and classifying the acquired plurality of pieces of input data into a plurality of clusters in the n-dimensional feature space by an unsupervised clustering method based on a distribution status of the plurality of pieces of input data in the n-dimensional feature space;

newly acquiring a piece of input data based on newly detected sensor data detected by said at least one sensor provided to the apparatus;

mapping the newly acquired piece of input data to the n-dimensional feature space according to values of the feature components of the newly acquired piece of input data and determining, as a cluster to which the newly acquired input data belongs, a cluster which is closest to the newly acquired piece of input data in the n-dimensional feature space from among the plurality of clusters;

calculating a distance in the n-dimensional feature space between the newly acquired piece of input data and a center of the cluster to which the newly acquired piece of input data belongs, and acquiring relationship data representing a relationship between the newly acquired piece of input data and the cluster to which the newly acquired piece of input data belongs, based on the calculated distance; and controlling movement of the apparatus based on the acquired relationship data.

10. A non-transitory computer-readable storage medium having stored thereon a program that is executable by a computer to control the computer to perform functions comprising:

repeatedly acquiring input data based on sensor data indicating at least one of acceleration and angular velocity generated by application of an external force to an apparatus and detected by at least one sensor provided to the apparatus, to thereby acquire a plurality of pieces of input data, wherein each piece of input data comprises a predetermined number of feature components having values calculated from the sensor data, mapping the plurality of pieces of input data in n-dimensional feature space according to the values of the feature components of each of the plurality of pieces of input data, where n is the predetermined number of feature components constituting each of the plurality of pieces of input data, and classifying the plurality of pieces of input data into a plurality of clusters in the n-dimensional feature space by an unsupervised clustering method based on a distribution status of the plurality of pieces of input data in the n-dimensional feature space, newly acquiring a piece of input data based on newly detected sensor data detected by said at least one sensor provided to the apparatus;

mapping the newly acquired piece of input data to the n-dimensional feature space according to values of the feature components of the newly acquired piece of input data and determining, as a cluster to which the newly acquired input data belongs, a cluster which is closest to the newly acquired piece of input data in the n-dimensional feature space from among the plurality of clusters;

calculating a distance in the n-dimensional feature space between the newly acquired piece of input data and a center of the cluster to which the newly acquired piece of input data belongs, and acquiring relationship data representing a relationship between the newly acquired piece of input data and the cluster to which the newly acquired piece of input data belongs, based on the calculated distance, and controlling movement of the apparatus based on the acquired relationship data.

* * * * *